United States Patent
Wang et al.

(10) Patent No.: US 12,339,126 B2
(45) Date of Patent: Jun. 24, 2025

(54) VEHICULAR POSITIONING METHOD AND SYSTEM

(71) Applicant: National Yang Ming Chiao Tung University, Hsinchu (TW)

(72) Inventors: Chia-Cheng Wang, New Taipei (TW); Jyh-Cheng Chen, Hsinchu (TW)

(73) Assignee: NATIONAL YANG MING CHIAO TUNG UNIVERSITY, Hsinchu (TW)

( * ) Notice: Subject to any disclaimer, the term of this patent is extended or adjusted under 35 U.S.C. 154(b) by 409 days.

(21) Appl. No.: 17/877,625

(22) Filed: Jul. 29, 2022

(65) Prior Publication Data
US 2023/0123039 A1 Apr. 20, 2023

Related U.S. Application Data

(60) Provisional application No. 63/256,973, filed on Oct. 18, 2021.

(51) Int. Cl.
*G01C 21/30* (2006.01)
*G01C 21/36* (2006.01)
*G06V 20/58* (2022.01)

(52) U.S. Cl.
CPC ......... *G01C 21/30* (2013.01); *G01C 21/3667* (2013.01); *G06V 20/58* (2022.01)

(58) Field of Classification Search
CPC ..... G01C 21/30; G01C 21/3667; G06V 20/58
See application file for complete search history.

(56) References Cited

U.S. PATENT DOCUMENTS

| 11,328,520 | B2 | 5/2022 | Yang et al. |
| 11,900,698 | B2* | 2/2024 | Akachi ................. G08G 1/161 |
| 2015/0116134 | A1* | 4/2015 | Wang ..................... G08G 1/141 |
| | | | 340/932.2 |
| 2016/0282128 | A1* | 9/2016 | Zeng ........................ G01S 19/42 |
| 2019/0120939 | A1* | 4/2019 | O'Keeffe .............. G01S 7/4817 |
| 2019/0293444 | A1* | 9/2019 | Ben Moshe ....... G01C 21/3602 |
| 2021/0295061 | A1* | 9/2021 | Yang ..................... G06V 20/588 |
| 2022/0297678 | A1* | 9/2022 | Nakagawa ......... B62D 15/0285 |

OTHER PUBLICATIONS

Erhan Bas, Road and Traffic Analysis from Video, MS Thesis in Electrical and Computer Engineering, Koc University, Aug. 2007 (89 pages).
Sung-ju Kim and Soon-Yong Park, "Lane-level Positioning based on 3D Tracking Path of Traffic Signs," Proceedings of the 11th Joint Conference on Computer Vision, Imaging and Computer Graphics Theory and Applications, VISIGRAPP, vol. 3, 2016, pp. 644-650.

* cited by examiner

Primary Examiner — Anil K Bhargava
(74) Attorney, Agent, or Firm — HSML P.C.

(57) ABSTRACT

A vehicular positioning method is provided for positioning a vehicle that is running on a road, where the road has a plurality of feature objects that have the same detectable feature and that are disposed along the road. The vehicle is provided with a system that counts a number of the feature objects the vehicle has passed by as the vehicle runs on the road, and that calculates a travelling distance the vehicle has traveled on the road based on the number counted thereby, an object length of the feature objects, and spacing between adjacent two of the feature objects. Then, the system displays an electronic map that shows the road and that indicates a position of the vehicle on the road based on the calculated travelling distance.

16 Claims, 5 Drawing Sheets

VEHICULAR POSITIONING METHOD AND SYSTEM

CROSS-REFERENCE TO RELATED APPLICATION

This application claims priority of U.S. Provisional Patent Application No. 63/256,973, filed on Oct. 18, 2021.

FIELD

The disclosure relates to vehicle positioning, and more particularly to a vehicular positioning method that uses repeating feature objects on a road as references for positioning a vehicle.

BACKGROUND

When a vehicle enters a tunnel or an underpass, a global navigation satellite system (GNSS) installed on the vehicle is often unable to perform positioning or at least unable to perform accurate positioning because the GNSS cannot receive sufficient satellite signals, and the vehicle position illustrated on an electronic map may thus deviate from its actual position, which may cause the driver to drive in a wrong direction or misjudge its geographical location.

SUMMARY

Therefore, an object of the disclosure is to provide a vehicular positioning method that can accurately position a vehicle, at least in tunnels or underpasses where the GNSS cannot effectively operate.

According to the disclosure, the vehicular positioning method is provided for positioning a vehicle that is running on a road, where the road has a plurality of feature objects that have the same detectable feature and that are disposed along the road. The vehicular positioning method includes steps of: A) by an object detecting device that is set on the vehicle, detecting the feature objects the vehicle passes by as the vehicle runs on the road, so as to generate an object detection result; B) by a vehicle positioning device that is set on the vehicle, counting a number of the feature objects the vehicle has passed by as the vehicle runs on the road based on the object detection result, and calculating an object-count-based travelling distance the vehicle has traveled on the road based on the number counted thereby, an object length of the feature objects, and spacing between adjacent two of the feature objects; and C) by the vehicle positioning device, displaying an electronic map that shows the road and that indicates a position of the vehicle on the road based on the object-count-based travelling distance.

Another object of the disclosure is to provide a vehicular positioning system that can accurately position a vehicle, at least in tunnels or underpasses where the GNSS cannot effectively operate.

According to the disclosure, the vehicular positioning system is provided for positioning a vehicle that is running on a road, where the road has a plurality of repeating feature objects that have a same detectable feature and that are disposed along the road. The vehicular positioning system includes an object detecting device and a vehicle positioning device. The object detecting device is to be set on the vehicle, and is configured to detect the feature objects the vehicle passes by as the vehicle runs on the road, so as to generate an object detection result. The vehicle positioning device is to be set on the vehicle, and is electrically connected to the object detecting device. The vehicle positioning device stores an electronic map related to the road, and is configured to count a number of the feature objects the vehicle has passed by as the vehicle runs on the road based on the object detection result, and to calculate an object-count-based travelling distance the vehicle has traveled on the road based on the number counted thereby, an object length of the feature objects, and spacing between adjacent two of the feature objects. The vehicle positioning device is configured to display the electronic map that shows the road and that indicates a position of the vehicle on the road based on the object-count-based travelling distance.

Yet another object of the disclosure is to provide a non-transitory computer-readable storage medium that, when executed by a vehicle positioning device that is electrically connected to an object detecting device, cause the vehicle positioning device and the object detecting device to perform the vehicular positioning method of this disclosure.

BRIEF DESCRIPTION OF THE DRAWINGS

Other features and advantages of the disclosure will become apparent in the following detailed description of the embodiment(s) with reference to the accompanying drawings, of which.

DETAILED DESCRIPTION

Figure 1:
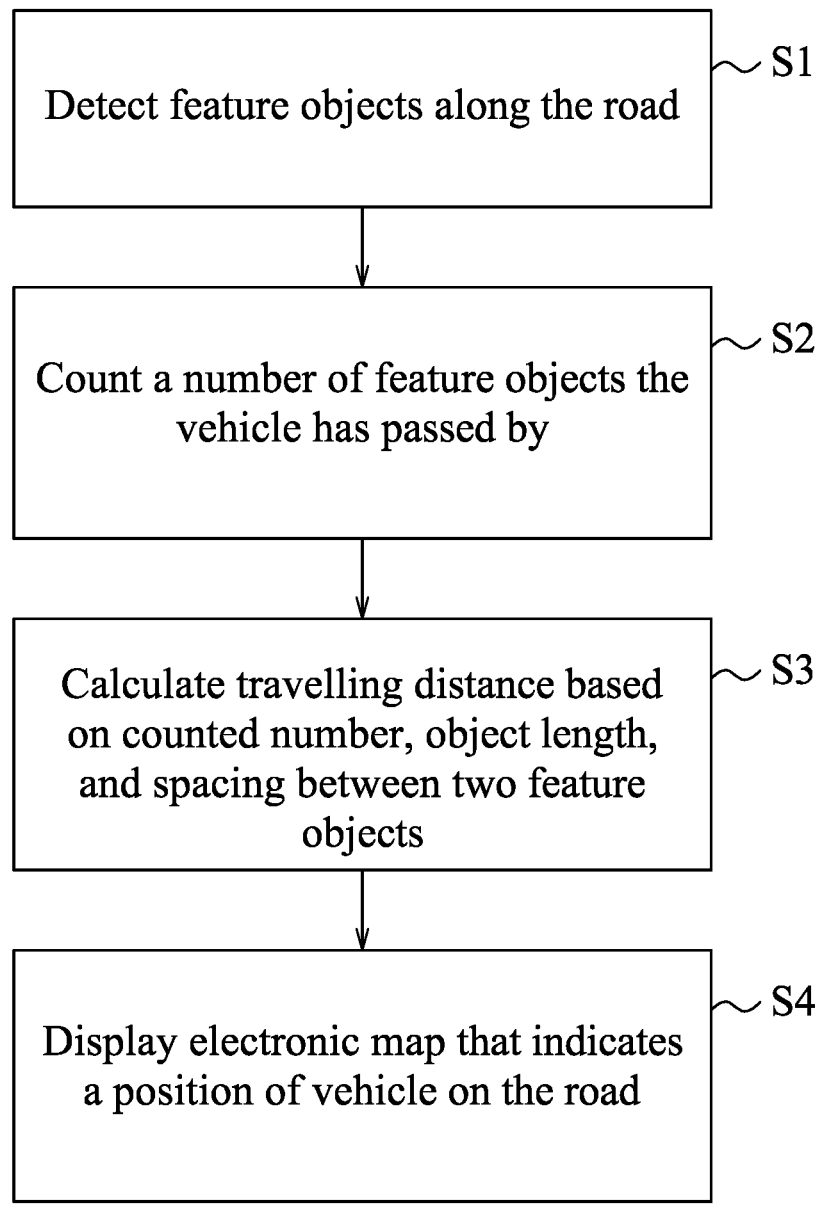
FIG. 1 is a flow chart illustrating steps of a vehicular positioning method in accordance with some embodiments.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
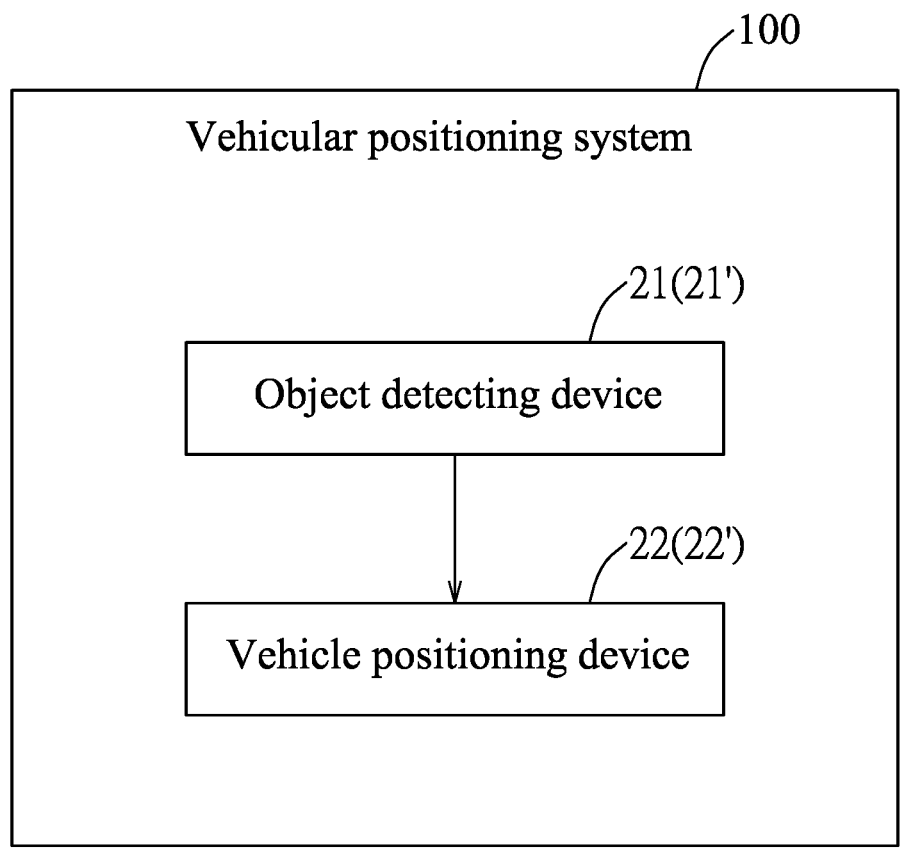
FIG. 2 is a block diagram illustrating a vehicular positioning system in accordance with some embodiments.
Figure 3:
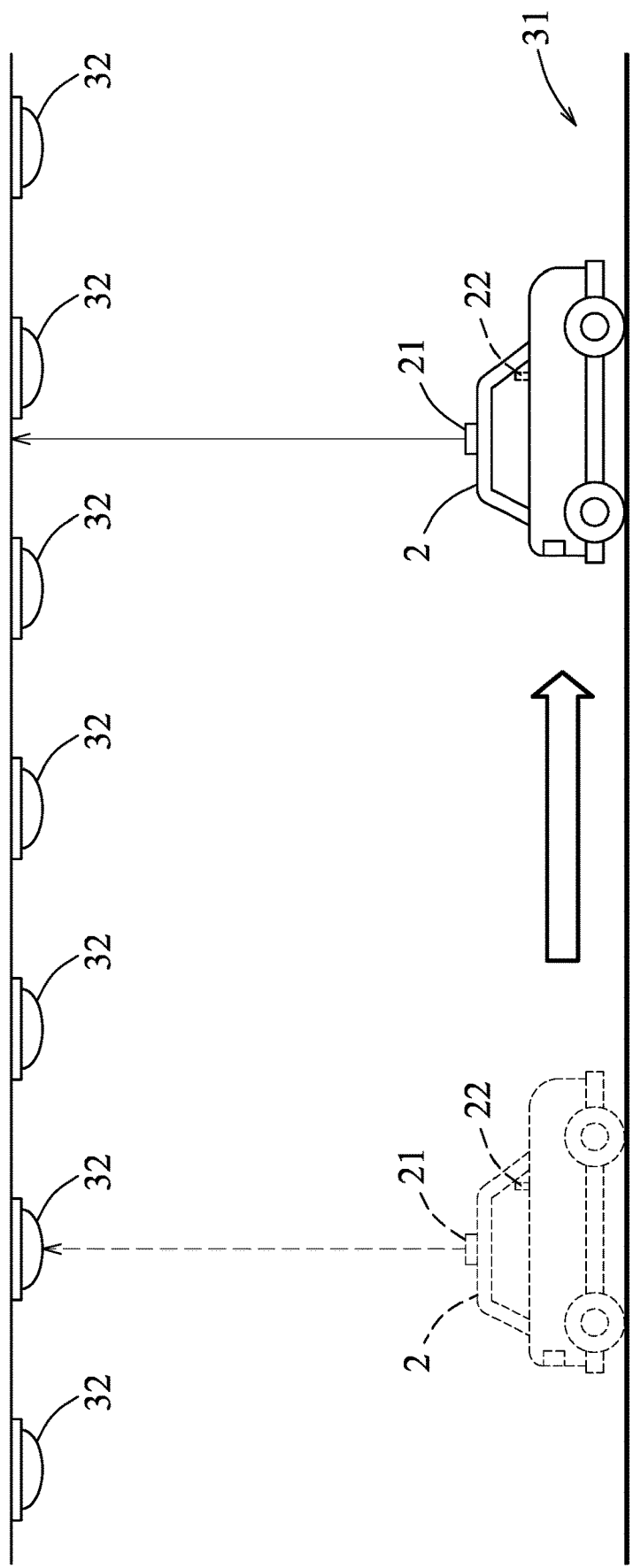
FIG. 3 is a schematic diagram illustrating operation of an object detecting device of the vehicular positioning system in a first embodiment.

Referring to FIGS. 1 to 3, a first embodiment of a vehicular positioning method according to this disclosure is implemented by a vehicular positioning system 100 for positioning a vehicle 2 that is running on a road 31, where the road 31 has a plurality of repeating feature objects 32 along the road 31. The feature objects 32 have the same detectable features, and are equidistantly disposed along the road 31. In this embodiment, the detectable features may be appearance features such as a length in a travelling direction of the vehicle 2, which is referred to as object length hereinafter. In some embodiments, the detectable features may be of other types, such as magnetic fields produced by the feature objects 32, vibrations of the feature objects, etc., and this disclosure is not limited in this respect. In this embodiment, the road 31 is exemplified as a tunnel or an underpass, and the feature objects 32 are exemplified as illuminating lamps that are mounted to a top wall of the tunnel or the underpass. The vehicular positioning system 100 includes an object detecting device 21 and a vehicle positioning device 22 that are set on the vehicle 2. In the first embodiment, the object detecting device 21 may be a rangefinder that is set on top of the vehicle 2. The rangefinder may be, for example but not limited to, a laser rangefinder, a lidar rangefinder, a radar rangefinder, an ultrasonic rangefinder, an infrared rangefinder, or the like. The vehicle positioning device 22 may be, for example but not limited to, a smartphone, a portable computer, an electronic control unit (ECU) that is installed in the vehicle 2 and that includes a screen (or is connected to a screen of the vehicle) for display. Further, the vehicle positioning device 22 includes a geopositioning system that may be, for example but not limited to, a global navigation satellite system (GNSS), which is capable of providing information of current geographic location of the vehicle 2 (referred to as current vehicle location) for use by the vehicle positioning device 22. The vehicle positioning device 22 includes a non-transitory computer-readable storage medium (e.g., flash memory) that stores geographic location data of a starting point of the road 31, an electronic map (e.g., to be used by the GNSS for navigation) that is related the road 31 (e.g., containing data of the road 31), the object length of the feature objects 32, and spacing between adjacent two of the feature objects 32, etc., but this disclosure is not limited in this respect. In some embodiments, the abovementioned data may be stored in a cloud storage or a fog storage that is accessible by the vehicle positioning device 22. The non-transitory computer-readable storage medium further stores a software program including program instructions that, when executed by a processing unit (e.g., a central processing unit (CPU) or a microprocessor) of the vehicle positioning device 22, cause the vehicle positioning device 22 to request the information of the current vehicle location from the geopositioning system, to request an object detection result from the object detecting device 21, and to perform the following steps.

When the vehicle 2 is running, the vehicle positioning device 22 continuously determines, based on the current vehicle location received from the geopositioning system, whether the current vehicle location is the starting point of the road 31. Upon determining that the current vehicle location is the starting point of the road 31, the vehicle positioning device 22 reads data related to the road 31, such as the electronic map that includes the road 31, the object length of the feature objects 32 and the spacing between adjacent two of the feature objects 32, and performs step S1 as illustrated in FIG. 1, where the vehicle positioning device 22 causes the object detecting device 21 to start detecting the feature objects 32 the vehicle 2 passes by as the vehicle 2 runs on the road 31, so as to generate the object detection result, and to transmit the object detection result to the vehicle positioning device 22.

In step S2, the vehicle positioning device 22 counts, based on the object detection result, a number of the feature objects 32 the vehicle 2 has passed by as the vehicle 2 runs on the road 31. In detail, as illustrated in FIG. 3, the object detecting device 21 may emit range-finding signals outwardly with respect to the vehicle 2 and receive reflected range-finding signals to obtain the object detection result, where each of the reflected range-finding signals refers to one of the range-finding signals that is reflected by an object (e.g., a feature object 32 or an object nearby a feature object 32, such as a wall surface of the tunnel or the underpass) the vehicle 2 is passing by. In some embodiments, the object detecting device 21 emits the range-finding signals in specific directions, such as directions that are perpendicular to the travelling direction of the vehicle 2 (e.g., an upward direction, other inclined upward directions that are perpendicular to the travelling direction of the vehicle 2, etc.). In some embodiments, the object detection result includes the reflected range-finding signals. In the illustrative embodiment, since the feature objects 32 are set to the top wall of the tunnel or the underpass, a vertical distance between the vehicle 2 and the tunnel/underpass when the vehicle 2 is directly below the feature object 32 (i.e., a vertical distance between the vehicle 2 and a feature object 32) is different from (to be specific, "smaller than" in the illustrative embodiment) a vertical distance between the vehicle 2 and the tunnel/underpass when the vehicle 2 is not directly below any one of the feature objects 32 (i.e., a vertical distance between the vehicle 2 and the top wall of the tunnel/underpass). As a result, time required for the object detecting device 21 to receive the reflected range-finding signal from a feature object 32 when the vehicle 2 is directly below the feature object 32 is thus different from (to be specific, "shorter than" in the illustrative embodiment) time required for the object detecting device 21 to receive the reflected range-finding signal from the top wall when the vehicle 2 is not directly below any one of the feature objects 32. It is noted that, since the feature objects 32 in the illustrative embodiment have the same dimensions, the time required for the object detecting device 21 to receive the reflected range-finding signal from one feature object 32 when the vehicle 2 is directly below said one feature object 32 will be the same or nearly the same as the time required for the object detecting device 21 to receive the reflected range-finding signal from another feature object 32 when the vehicle 2 is directly below said another feature object 32. Accordingly, the vehicle positioning device 22 can identify which reflected range-finding signals are reflected by the feature objects 32 based on characteristics of the reflected range-finding signals (e.g., the lengths of time it takes to receive the reflected range-finding signals), so as to count the number of the feature objects 32 the vehicle 2 has passed by based on those of the reflected range-finding signals that are reflected by the feature objects 32.

In step S3, the vehicle positioning device 22 calculates an object-count-based travelling distance the vehicle 2 has traveled on the road 31 based on the number counted thereby, the object length of the feature objects 32, and the spacing between adjacent two of the feature objects 32.

In step S4, the vehicle positioning device 22 displays the electronic map that shows the road 31 and that indicates a position of the vehicle 2 on the road 31 based on the object-count-based travelling distance, which approximates to a distance the vehicle 2 has travelled from the starting point of the road 31. As an example, the vehicle positioning device 22 may display a symbol that represents the vehicle 2 on the electronic map at a position on the road 31 that is away from the starting point of the road 31 by a map distance corresponding to the object-count-based travelling distance (e.g., by mapping the object-count-based travelling distance to the electronic map using a proportional scale of the electronic map). Then, the flow goes back to step S1 to repeat the flow until the vehicle 2 has left the road 31. In some embodiments, the vehicle positioning device 22 may store a length of the road 31, and the vehicle positioning device 22 determines that the vehicle 2 has left the road 31 upon determining that the object-count-based travelling distance is greater than the length of the road 31.

In some cases where the spacing between adjacent two of the feature objects 32 is large (e.g., greater than two meters), a more precise positioning may be required. To achieve more precise positioning, in step S3, the vehicle positioning device 22 may further calculate, when the vehicle 2 is running between two adjacent feature objects 32 (i.e., between the most recent feature object 32 and the next feature object 32), an adjustment travelling distance the vehicle 2 has travelled between the most recent one and the next one of the feature objects 32 based on time elapsed from the vehicle 2 entering the road 31, the number of the feature objects 32 the vehicle 2 has passed by, and the spacing between adjacent two of the feature objects 3. For example, the vehicle positioning device 22 may estimate a speed of the vehicle 2 based on the number of the feature objects 32 the vehicle 2 has passed by, the spacing between adjacent two of the feature objects 3 and time elapsed from the vehicle 2 entering the road 31 to the vehicle 2 passing by the most recent one of the feature objects 3, and then calculate the adjustment travelling distance by multiplying the estimated speed by a difference between time elapsed from the vehicle 2 entering the road 31 to a current time point and the time elapsed from the vehicle 2 entering the road 31 to the vehicle 2 passing by the most recent one of the feature objects 3. Then, the vehicle positioning device 22 adds the adjustment travelling distance to the object-count-based travelling distance to obtain an adjusted travelling distance, and displays the electronic map that shows the road 31 and that indicates the position of the vehicle 2 on the road 31 based on the adjusted travelling distance in step S4.

In some embodiments, the object detecting device 21 may be set on a lateral surface of the vehicle 2 and emit the range-finding signals outwardly with respect to the vehicle 2 in lateral directions, and the road 31 is not limited to a tunnel or an underpass, and may be, for example but not limited to, a surface road or an elevated road. In such a scenario, the feature objects 32 may be, for example but not limited to, street lights, acoustic barriers, anti-glare screens, railing balusters, or pillars, etc., and the vehicle positioning device 22 can count the number of the feature objects 32 the vehicle 2 has passed by based on the reflected range-finding signals that are included in the object detection result.

In practice, the vehicle positioning device 22 may store geographical location data of a starting point, an object length of feature objects, spacing between adjacent two of the feature objects for a plurality of different roads, and the electronic map may contain data of the roads, so the vehicular positioning system 100 can perform the abovementioned embodiment of the vehicular positioning method when the vehicle positioning device 22 determines that the vehicle 2 has entered one of the roads based on the geographical location data of the starting point of the road.

Figure 4:
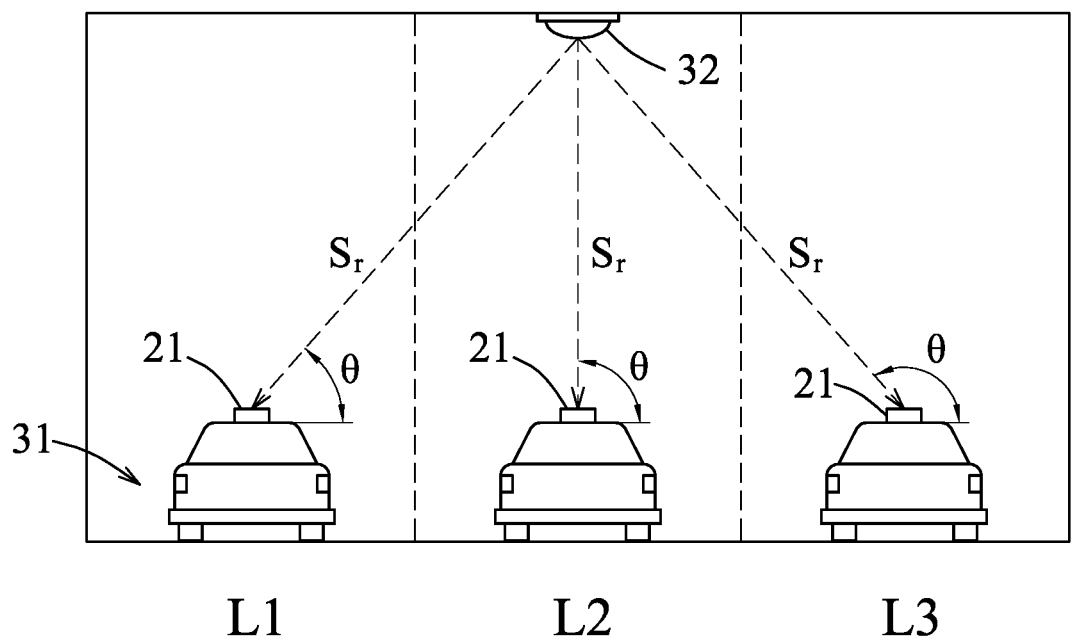
FIG. 4 is a schematic diagram illustrating that a first approach for the vehicular positioning system to determine which one of multiple lanes the vehicle is running on in the first embodiment.
Figure 5:
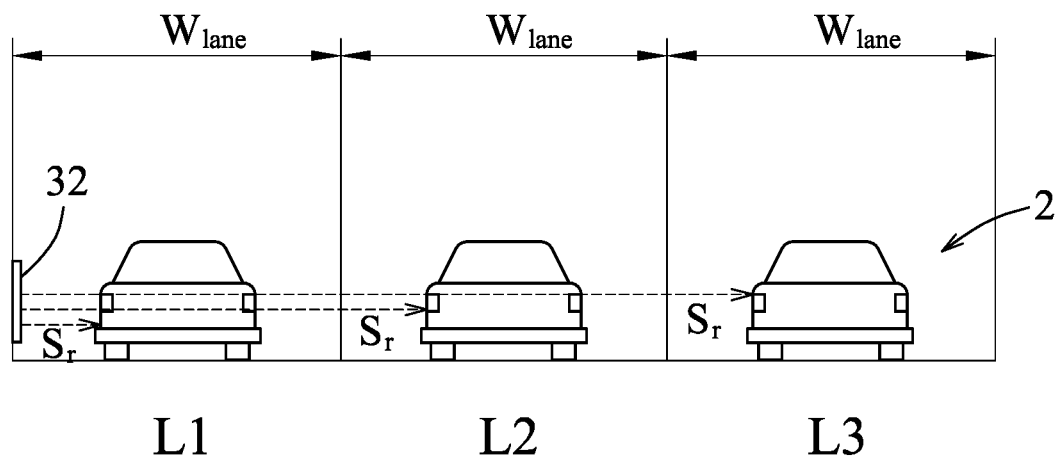
FIG. 5 is a schematic diagram illustrating that a second approach for the vehicular positioning system to determine which one of multiple lanes the vehicle is running on in the first embodiment.

Referring to FIGS. 2, 4 and 5, the road 31 may have multiple lanes L1-L3, so in some embodiments, the vehicle positioning device 22 may be configured to identify which of the lanes L1-L3 the vehicle 2 is running on, and the road 31 on the electronic map may be provided with multiple virtual lanes that respectively correspond to the lanes L1-L3 of the road 31.

In FIG. 4, the road 31 is exemplified as a tunnel or an underpass, the feature objects 32 (e.g., illuminating lamps, only one of which can be seen from the viewing angle of FIG. 4) are mounted to the top wall of the road 31, the object detecting device 21 is set on top of the vehicle 2 and emits the range-finding signals upwardly (e.g., in a direct upward direction and/or inclined upward directions), and the lane that is closest to the feature objects 32 is the middle lane L2. In such a scenario, the vehicle positioning device 22 records a number of the lanes L1-L3 of the road 31, and one of the lanes L1-L3 the feature objects 32 are closest to (i.e. the middle lane L2 in FIG. 4), and determines, in step S3, which one of the lanes L1-L3 the vehicle 2 is running on based on incident angles $\theta$ of those of the reflected range-finding signals $S_r$ reflected by the feature objects 32, the number of the lanes L1-L3 of the road 31, and said one of the lanes L1-L3 the feature objects 32 are closest to. For example, the vehicle positioning device 22 may be configured to determine that the vehicle 2 is running on the lane L3 when the reflected range-finding signal received by the object detecting device 21 has an incident angle $\theta$ greater than 100 degrees, to determine that the vehicle 2 is running on the lane L2 when the reflected range-finding signal received by the object detecting device 21 has an incident angle $\theta$ ranging between 80 degrees and 100 degrees, and to determine that the vehicle 2 is running on the lane L1 when the reflected range-finding signal received by the object detecting device 21 has an incident angle $\theta$ smaller than 80 degrees. Then, the vehicle positioning device 22 displays, in step S4, the electronic map that shows the road 31 with the virtual lanes and that indicates the position of the vehicle 2 on one of the virtual lanes that corresponds to said one of the lanes L1-L3 the vehicle 2 is running on.

In FIG. 5, where the feature objects 32 are disposed to the side of the road 31, the object detecting device 21 (see FIG. 2) is exemplified to be set on a lateral surface of the vehicle 2 and emits the range-finding signals laterally (e.g., in a direct lateral direction and/or inclined lateral directions), and the lane that is closest to the feature objects 32 is the left lane L1. In such a scenario, the vehicle positioning device 22 records a lane width $W_{lane}$ of each of the lanes L1-L3 of the road 31 (usually the lanes L1-L3 have the same lane width $W_{lane}$), and one of the lanes L1-L3 the feature objects 32 are closest to (i.e., the left lane L1 in FIG. 5), and calculates, in step S3, a vehicle-to-object distance between the vehicle 2 and one of the feature objects 32 that is at a lateral side of the vehicle 2 based on one of the reflected range-finding signals $S_r$ that is reflected by said one of the feature objects 32 (e.g., based on the time of receipt of said one of the reflected range-finding signals $S_r$). Then, the vehicle positioning device 22 determines, in step S4, which one of the lanes L1-L3 the vehicle 2 is running on based on the lane width $W_{lane}$, said one of the lanes L1-L3 the feature objects 32 are closest to, and the vehicle-to-object distance. For example, the vehicle positioning device 22 may be configured to determine that the vehicle 2 is running on the lane L1 when the vehicle-to-object distance is smaller than the lane width to determine that the vehicle 2 is running on the lane L2 when the vehicle-to-object distance is greater than the lane width $W_{lane}$ and smaller than twice the lane width $W_{lane}$, and to determine that the vehicle 2 is running on the lane L3 when the vehicle-to-object distance$_o$ is greater than twice the lane width $W_{lane}$. Then, the vehicle positioning device 22 displays, in step S4, the electronic map that shows the road 31 with the virtual lanes and that indicates the position of the vehicle 2 on one of the virtual lanes that corresponds to said one of the lanes L1-L3 the vehicle 2 is running on.

Figure 6:
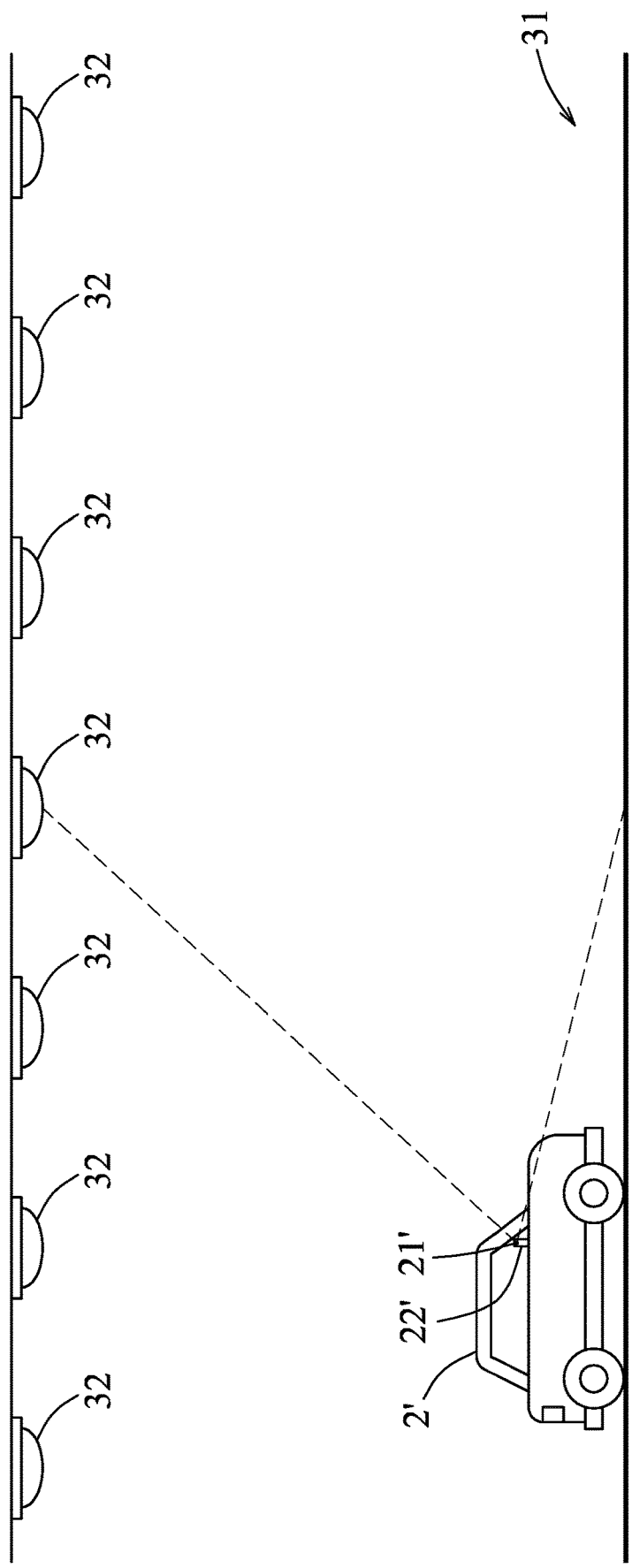
FIG. 6 is a schematic diagram illustrating operation of an object detecting device of the vehicular positioning system in a second embodiment.

Referring to FIGS. 1, 2 and 6, a second embodiment of a vehicular positioning method according to this disclosure is similar to the first embodiment, but differs from the first embodiment in that the object detecting device 21' of the second embodiment is a camera device. In some implementations, the vehicle positioning device 22' of the second embodiment may be a smartphone, and the camera device (i.e., the object detecting device 21') may be a camera module integrated in the smartphone. The smartphone may be set at a position close to a front windshield of the vehicle 2', so that the camera module thereof can capture images of the road 31 and its surroundings. In some implementations, the camera device (i.e., the object detecting device 21') may be a driving recorder, and the vehicle positioning device 22' the ECU of the vehicle 2' that is provided with (or connected to) a screen for display.

Similarly, the vehicle positioning device 22' is installed with a geopositioning system as described in the first embodiment, which can provide the information of the current vehicle location for use by the vehicle positioning device 22'. The vehicle positioning device 22' also stores geographic location data of the starting point of the road 31, the electronic map that is related the road 31, the object length of the feature objects 32, and the spacing between adjacent two of the feature objects 32. Upon determining that the current vehicle location is the starting point of the road 31, the vehicle positioning device 22' performs step S1 to cause the object detecting device 21' to start capturing road images that contain the feature objects 32 (e.g., illuminating lamps in a tunnel, as illustrated in FIG. 6) to generate the object detection result when the vehicle 2' is running on the road 31. In step S2, the vehicle positioning device 22' may use a conventional image recognition technique to identify the feature objects 32 in the road images, so as to count the number of the feature objects 32 the vehicle 2' has passed by. For example, upon determining that one of the feature objects 32 that is originally in a previous road image becomes absent in the latest road image, the vehicle positioning device 22' may determine that the vehicle 2' has passed by said one of the feature objects 32, so as to count the number of the feature objects 32 the vehicle 2' has passed by. In step S3, the vehicle positioning device 22' may calculate the object-count-based travelling distance the vehicle 2' has traveled on the road 31 based on the number counted thereby, the object length of the feature objects 32, and the spacing between adjacent two of the feature objects 32.

It is noted that, in the second embodiment, the feature objects 32 are not limited to the illuminating lamps as exemplified in FIG. 6, and may be, for example but not limited to, street lights, acoustic barriers, anti-glare screens, railing balusters, pillars, road marking like dashed lines, or other objects that are present at the side of the road 32 and that have repeating appearance features.

In some cases where a more precise positioning is required between adjacent two of the feature objects 31 that are further apart (e.g., greater than two meters apart), in step S3, the vehicle positioning device 22' may further calculate, when the vehicle 2' is running between two adjacent feature objects 32 (i.e., between the most recent feature object 32 and the next feature object 32), an adjustment travelling distance the vehicle 2' has travelled between the most recent one and the next one of the feature objects 32 based on an object-to-object pixel number and a vehicle-to-object pixel number, where the object-to-object pixel number is a number of pixels that corresponds to the spacing between adjacent two of the feature objects 32 in the road images, and the vehicle-to-object pixel number is a number of pixels that corresponds to a distance between the current vehicle location of the vehicle 2' and the next one of the feature objects 32. For example, if the spacing between adjacent two of the feature objects 32 is five meters and corresponds to fifty pixels in the road image, the vehicle 2' may determine that the vehicle 2' is away from the next one of the feature objects 32 by two meters when a number of pixels that corresponds to a distance between the current vehicle location of the vehicle 2' and the next one of the feature objects 32 is twenty pixels, so the adjustment travelling distance can be acquired to be three meters by subtracting two meters from five meters. Then, the vehicle positioning device 22' adds the adjustment travelling distance to the object-count-based travelling distance to obtain an adjusted travelling distance, and displays the electronic map that shows the road 31 and that indicates the position of the vehicle 2 on the road 31 based on the adjusted travelling distance in step S4, as illustrated in FIG. 1.

In some embodiments, the vehicle positioning device 22' may be configured to identify, when the road 31 has multiple lanes, which one of the lanes the vehicle 2' is running on using image recognition techniques, and the road 31 in the electronic map may be provided with multiple virtual lanes that respectively correspond to the lanes of the road 31.

To sum up, the embodiments of this disclosure use the object detecting device to detect the feature objects the vehicle passes by on a road, where the feature objects have the same detectable features, so the vehicle positioning device can count the number of the features objects the vehicle has passed by based on the object detection result, and then calculate the object-count-based travelling distance based on the number counted thereby, the object length of the feature objects, and the spacing between adjacent two of the feature objects. The vehicle positioning device may further calculate the adjustment travelling distance the vehicle has travelled between the most recent one and the next one of the feature objects based on time elapsed from the vehicle entering the road, the number of the feature objects the vehicle has passed by, and the spacing between adjacent two of the feature objects, or based on the object-to-object pixel number and the vehicle-to-object pixel number, and then obtain the adjusted travelling distance, which is more precise than the object-count-based travelling distance. In addition, the vehicle positioning device may further determine which one of the lanes the vehicle is running on.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A vehicular positioning method for positioning a vehicle that is running on a road, the road having a plurality of feature objects that have a same detectable feature and that are disposed along the road, said vehicular positioning method comprising steps of:
   A) by an object detecting device that is set on the vehicle, detecting the feature objects the vehicle passes by as the vehicle runs on the road, so as to generate an object detection result;
   B) by a vehicle positioning device that is set on the vehicle, counting a number of the feature objects the vehicle has passed by as the vehicle runs on the road based on the object detection result, and calculating an object-count-based travelling distance the vehicle has traveled on the road based on the number counted thereby, an object length of the feature objects, and spacing between adjacent two of the feature objects; and
   C) by the vehicle positioning device, displaying an electronic map that shows the road and that indicates a position of the vehicle on the road based on the object-count-based travelling distance,
   wherein the object detecting device is a rangefinder that emits range-finding signals outwardly with respect to the vehicle and that receives reflected range-finding signals to obtain the object detection result, where each of the reflected range-finding signals is one of the range-finding signals that is reflected by an object the vehicle passes by;
   wherein the object detecting device counts the number of the feature objects the vehicle has passed by based on those of the reflected range-finding signals that are reflected by the feature objects;
   wherein the road has multiple lanes, the object detecting device is set on top of the vehicle, and the road on the electronic map is provided with multiple virtual lanes that respectively correspond to the lanes of the road; and
   wherein the vehicle positioning device records a number of the lanes of the road, and one of the lanes the feature objects are closest to;
   said vehicular positioning method further comprising a step of:
   by the vehicle positioning device, determining which one of the lanes the vehicle is running on based on incident angles of said those of the reflected range-finding signals, the number of the lanes of the road, and said one of the lanes the feature objects are closest to,
   wherein, in step C), the vehicle positioning device displays the electronic map that shows the road with the virtual lanes and that indicates the position of the vehicle on one of the virtual lanes that corresponds to said one of the lanes the vehicle is running on.

2. The vehicular positioning method of claim 1, further comprising steps of:
   by the vehicle positioning device, calculating an adjustment travelling distance the vehicle has travelled between a most recent one and a next one of the feature objects based on time elapsed from the vehicle entering the road, the number of the feature objects the vehicle has passed by, and the spacing between adjacent two of the feature objects; and
   by the vehicle positioning device, adding the adjustment travelling distance to the object-count-based travelling distance to obtain an adjusted travelling distance;
   wherein, in step C), the vehicle positioning device displays the electronic map that shows the road and that indicates the position of the vehicle on the road based on the adjusted travelling distance.

3. The vehicular positioning method of claim 1, wherein the object detecting device is a camera device that captures road images that contain the feature objects to generate the object detection result as the vehicle runs on the road, and the vehicle positioning device uses image recognition to identify the feature objects in the road images, so as to count the number of the feature objects the vehicle has passed by.

4. The vehicular positioning method of claim 3, further comprising steps of:
   by the vehicle positioning device, calculating an adjustment travelling distance the vehicle has travelled between a most recent one and a next one of the feature objects based on an object-to-object pixel number and a vehicle-to-object pixel number, where the object-to-object pixel number is a number of pixels that corresponds to the spacing between adjacent two of the feature objects in the road images, and the vehicle-to-object pixel number is a number of pixels that corresponds to a distance between the vehicle and the next one of the feature objects; and
   by the vehicle positioning device, adding the adjustment travelling distance to the object-count-based travelling distance to obtain an adjusted travelling distance;
   wherein, in step C), the vehicle positioning device displays the electronic map that shows the road and that indicates the position of the vehicle on the road based on the adjusted travelling distance.

5. The vehicular positioning method of claim 3, wherein the vehicle positioning device uses image recognition to identify which one of the lanes the vehicle is running on.

6. A vehicular positioning method for positioning a vehicle that is running on a road, the road having a plurality of feature objects that have a same detectable feature and that are disposed along the road, said vehicular positioning method comprising steps of:
   A) by an object detecting device that is set on the vehicle, detecting the feature objects the vehicle passes by as the vehicle runs on the road, so as to generate an object detection result;
   B) by a vehicle positioning device that is set on the vehicle, counting a number of the feature objects the vehicle has passed by as the vehicle runs on the road based on the object detection result, and calculating an object-count-based travelling distance the vehicle has traveled on the road based on the number counted thereby, an object length of the feature objects, and spacing between adjacent two of the feature objects; and
   C) by the vehicle positioning device, displaying an electronic map that shows the road and that indicates a position of the vehicle on the road based on the object-count-based travelling distance,
   wherein the object detecting device is a rangefinder that emits range-finding signals outwardly with respect to the vehicle and that receives reflected range-finding signals to obtain the object detection result, where each of the reflected range-finding signals is one of the range-finding signals that is reflected by an object the vehicle passes by;
   wherein the object detecting device counts the number of the feature objects the vehicle has passed by based on those of the reflected range-finding signals that are reflected by the feature objects;

wherein the road has multiple lanes, the object detecting device is set on a lateral surface of the vehicle, and the road on the electronic map is provided with multiple virtual lanes that respectively correspond to the lanes of the road; and wherein the vehicle positioning device records a lane width of each of the lanes of the road, and one of the lanes the feature objects are closest to;

said vehicular positioning method further comprising a step of:
  by the vehicle positioning device, calculating a vehicle-to-object distance between the vehicle and one of the feature objects based on one of the reflected range-finding signals that is reflected by said one of the feature objects; and
  by the vehicle positioning device, determining which one of the lanes the vehicle is running on based on the lane width, said one of the lanes the feature objects are closest to, and the vehicle-to-object distance;

wherein, in step C), the vehicle positioning device displays the electronic map that shows the road with the virtual lanes and that indicates the position of the vehicle on one of the virtual lanes that corresponds to said one of the lanes the vehicle is running on.

7. A vehicular positioning system for positioning a vehicle that is running on a road, the road having a plurality of feature objects that have a same detectable feature and that are disposed along the road, said vehicular positioning system comprising:
  an object detecting device that is to be set on the vehicle, and that is configured to detect the feature objects the vehicle passes by as the vehicle runs on the road, so as to generate an object detection result, wherein said object detecting device is one of a rangefinder and a camera device; and
  a vehicle positioning device that is to be set on the vehicle, and that is electrically connected to said object detecting device, wherein said vehicle positioning device is a computerized device including a screen;
  wherein said vehicle positioning device stores an electronic map related to the road, and is configured to count a number of the feature objects the vehicle has passed by as the vehicle runs on the road based on the object detection result, and to calculate an object-count-based travelling distance the vehicle has traveled on the road based on the number counted thereby, an object length of the feature objects, and spacing between adjacent two of the feature objects; and
  wherein said vehicle positioning device is configured to display the electronic map that shows the road and that indicates a position of the vehicle on the road based on the object-count-based travelling distance;
  wherein said object detecting device is a rangefinder that emits range-finding signals outwardly with respect to the vehicle and that receives reflected range-finding signals to obtain the object detection result, where each of the reflected range-finding signals is one of the range-finding signals that is reflected by an object the vehicle passes by;
  wherein said object detecting device is configured to count the number of the feature objects the vehicle has passed by based on those of the reflected range-finding signals that are reflected by the feature objects;
  wherein the road has multiple lanes, said object detecting device is set on top of the vehicle, and the road on the electronic map is provided with multiple virtual lanes that respectively correspond to the lanes of the road;
  wherein said vehicle positioning device records a number of the lanes of the road, and one of the lanes the feature objects are closest to, and is configured to determine which one of the lanes the vehicle is running on based on incident angles of said those of the reflected range-finding signals, the number of the lanes of the road, and said one of the lanes the feature objects are closest to; and
  wherein said vehicle positioning device displays the electronic map that shows the road with the virtual lanes and that indicates the position of the vehicle on one of the virtual lanes that corresponds to said one of the lanes the vehicle is running on.

8. The vehicular positioning system of claim 7, wherein said vehicle positioning device is configured to calculate an adjustment travelling distance the vehicle has travelled between a most recent one and a next one of the feature objects based on time elapsed from the vehicle entering the road, the number of the feature objects the vehicle has passed by, and the spacing between adjacent two of the feature objects; and
  wherein said vehicle positioning device is configured to add the adjustment travelling distance to the object-count-based travelling distance to obtain an adjusted travelling distance; and
  wherein said vehicle positioning device is configured to display the electronic map that shows the road and that indicates the position of the vehicle on the road based on the adjusted travelling distance.

9. The vehicular positioning system of claim 7, wherein said object detecting device is a camera device that is configured to capture road images that contain the feature objects to generate the object detection result when the vehicle is running on the road, and said vehicle positioning device is configured to use image recognition to identify the feature objects in the road images, so as to count the number of the feature objects the vehicle has passed by.

10. The vehicular positioning system of claim 9, wherein said vehicle positioning device is configured to calculate an adjustment travelling distance the vehicle has travelled between a most recent one and a next one of the feature objects based on an object-to-object pixel number and a vehicle-to-object pixel number, where the object-to-object pixel number is a number of pixels that corresponds to the spacing between adjacent two of the feature objects in the road images, and the vehicle-to-object pixel number is a number of pixels that corresponds to a distance between the vehicle and the next one of the feature objects;
  wherein said vehicle positioning device is configured to add the adjustment travelling distance to the object-count-based travelling distance to obtain an adjusted travelling distance; and
  wherein said vehicle positioning device is configured to display the electronic map that shows the road and that indicates the position of the vehicle on the road based on the adjusted travelling distance.

11. The vehicular positioning system of claim 9, wherein said vehicle positioning device is configured to use image recognition to identify which one of the lanes the vehicle is running on.

12. The vehicular positioning system of claim 9, wherein said vehicle positioning device is a smartphone, and said camera device is a camera module integrated in said smartphone.

13. The vehicular positioning system of claim 9, wherein said object detecting device is a driving recorder, and said vehicle positioning device is an electronic control unit (ECU) of the vehicle that is provided with a screen for display.

14. A vehicular positioning system for positioning a vehicle that is running on a road, the road having a plurality of feature objects that have a same detectable feature and that are disposed along the road, said vehicular positioning system comprising:
- an object detecting device that is to be set on the vehicle, and that is configured to detect the feature objects the vehicle passes by as the vehicle runs on the road, so as to generate an object detection result, wherein said object detecting device is one of a rangefinder and a camera device; and
- a vehicle positioning device that is to be set on the vehicle, and that is electrically connected to said object detecting device, wherein said vehicle positioning device is a computerized device including a screen;

wherein said vehicle positioning device stores an electronic map related to the road, and is configured to count a number of the feature objects the vehicle has passed by as the vehicle runs on the road based on the object detection result, and to calculate an object-count-based travelling distance the vehicle has traveled on the road based on the number counted thereby, an object length of the feature objects, and spacing between adjacent two of the feature objects;

wherein said vehicle positioning device is configured to display the electronic map that shows the road and that indicates a position of the vehicle on the road based on the object-count-based travelling distance;

wherein said object detecting device is a rangefinder that emits range-finding signals outwardly with respect to the vehicle and that receives reflected range-finding signals to obtain the object detection result, where each of the reflected range-finding signals is one of the range-finding signals that is reflected by an object the vehicle passes by;

wherein said object detecting device is configured to count the number of the feature objects the vehicle has passed by based on those of the reflected range-finding signals that are reflected by the feature objects;

wherein the road has multiple lanes, said object detecting device is set on a lateral surface of the vehicle, and the road on the electronic map is provided with multiple virtual lanes that respectively correspond to the lanes of the road;

wherein said vehicle positioning device records a lane width of each of the lanes of the road, and one of the lanes the feature objects are closest to, and is configured to calculate a vehicle-to-object distance between the vehicle and one of the feature objects based on one of the reflected range-finding signals that is reflected by said one of the feature objects, and to determine which one of the lanes the vehicle is running on based on the lane width, said one of the lanes the feature objects are closest to, and the vehicle-to-object distance; and wherein said vehicle positioning device is configured to display the electronic map that shows the road with the virtual lanes and that indicates the position of the vehicle on one of the virtual lanes that corresponds to said one of the lanes the vehicle is running on.

15. A non-transitory computer-readable storage medium comprising program instructions that, when executed by a vehicle positioning device that is electrically connected to an object detecting device, cause said vehicle positioning device and said object detecting device to perform the vehicular positioning method of claim 1.

16. A non-transitory computer-readable storage medium comprising program instructions that, when executed by a vehicle positioning device that is electrically connected to an object detecting device, cause said vehicle positioning device and said object detecting device to perform the vehicular positioning method of claim 6.

* * * * *